United States Patent [19]

Finney

[11] 4,043,200
[45] Aug. 23, 1977

[54] SURFACE THERMOCOUPLE

[75] Inventor: Philip F. Finney, Villa Park, Ill.

[73] Assignee: Thermo-Couple Products Company, Inc., Winfield, Ill.

[21] Appl. No.: 619,239

[22] Filed: Oct. 2, 1975

Related U.S. Application Data

[62] Division of Ser. No. 447,961, Mar. 4, 1974, Pat. No. 3,874,239, and Ser. No. 529,405, Dec. 4, 1974, Pat. No. 3,939,554.

[51] Int. Cl.$^2$ ............................................. G01K 1/04
[52] U.S. Cl. .................................................. 73/359 R
[58] Field of Search ................. 73/341, 349, 351, 359, 73/362.8; 136/221, 220, 230; 29/573

[56] References Cited

U.S. PATENT DOCUMENTS

| | | | |
|---|---|---|---|
| 2,516,952 | 8/1950 | Bristol | 136/229 |
| 3,069,752 | 12/1962 | Shering | 29/573 |
| 3,143,439 | 8/1964 | Hansen | 73/359 |
| 3,444,740 | 5/1969 | Davis | 73/351 |
| 3,466,200 | 9/1969 | Mellor | 29/573 |
| 3,477,122 | 11/1969 | Hamrick | 29/573 |
| 3,483,750 | 12/1969 | Pratt | 73/349 |
| 3,553,827 | 1/1971 | Baker | 29/573 |

Primary Examiner—S. Clement Swisher
Attorney, Agent, or Firm—Lockwood, Dewey, Zickert & Alex

[57] ABSTRACT

A surface thermocouple assembly including a metal sheath having thermocouple conductors extending therethrough in spaced relation from each other and from the sheath by electrical insulating material, an opening in the sheath wall at the hot junction end and through which the conductors are extended, a ceramic plug receiving the conductors and mounted in the opening, a fusion weld of the conductors outside the plug, and a V-shaped pad with a knife-shaped edge integrally formed at the junction end. The thermocouple is made from a length of sheathed thermocouple conductors by forming a keyhole slot at the junction end, removing the insulation around the conductors, bending the conductors through the opening of the keyhole slot, mounting a ceramic plug in place, fusion welding the ends of the conductors outside the plug to define the thermojunction, inserting a metal end plug at the junction end, welding closed the slot and the end plug in position, and building up a V-shaped welded pad at the hot junction end. Thereafter, mounting of the thermocouple assembly onto a surface for which the temperature is to be monitored includes the positioning of the hot junction end onto the tube with the knife-shaped edge of the pad in engagement with the tube, and providing void-free welds between the pad and the tube such that the distance between the thermojunction and the tube surface is substantially less than the distance between the junction and the closest free surface of the mounting welds.

1 Claim, 31 Drawing Figures

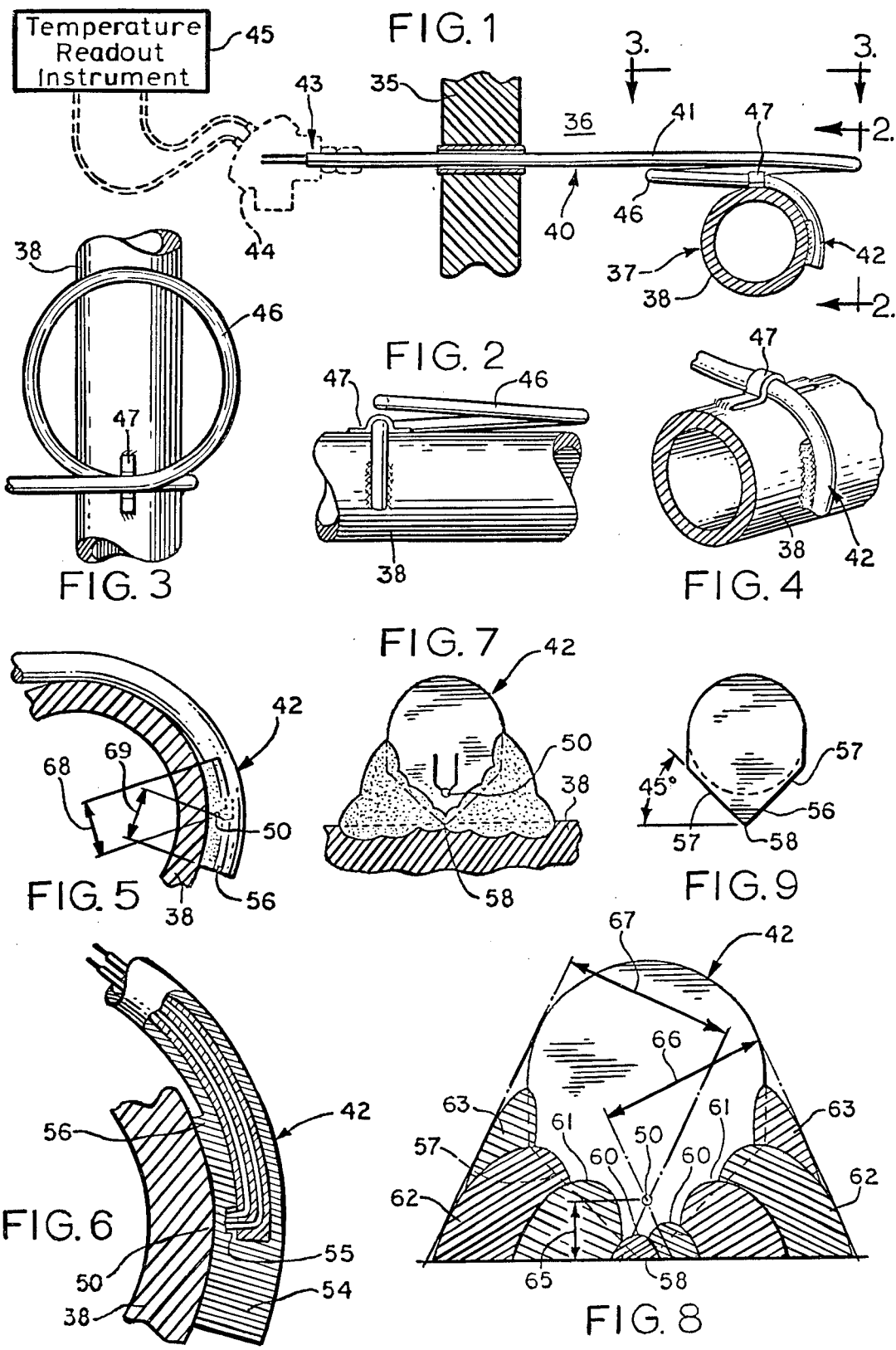

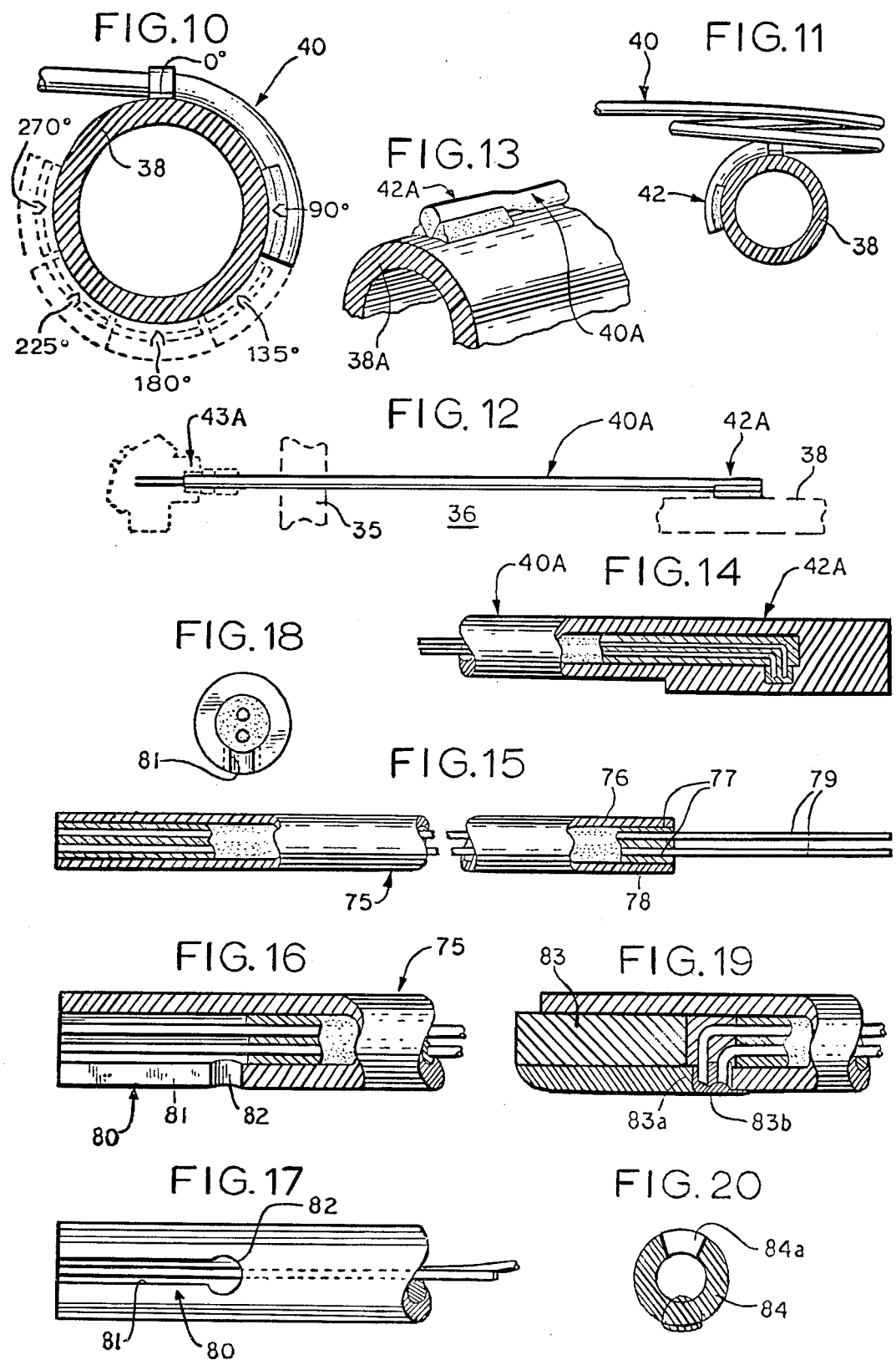

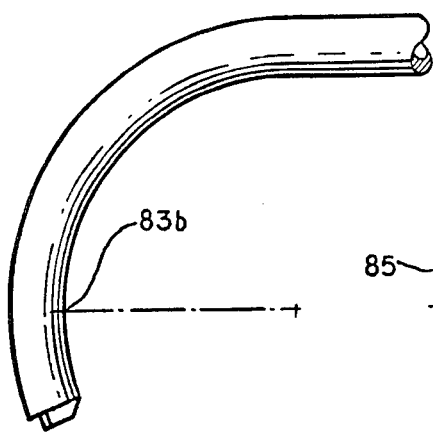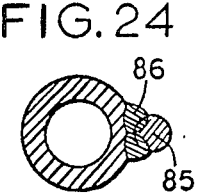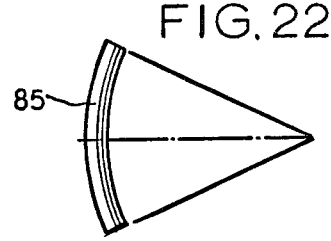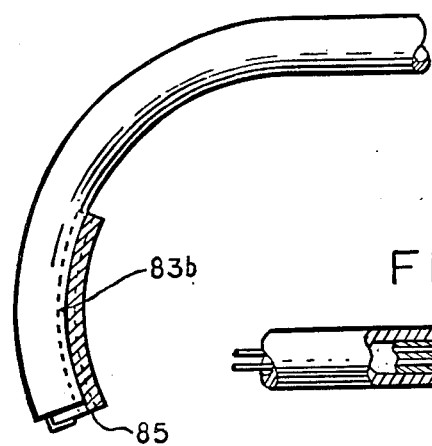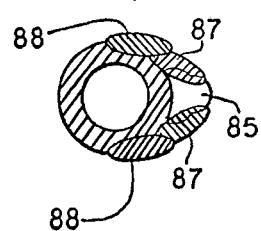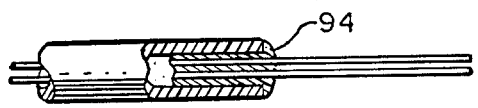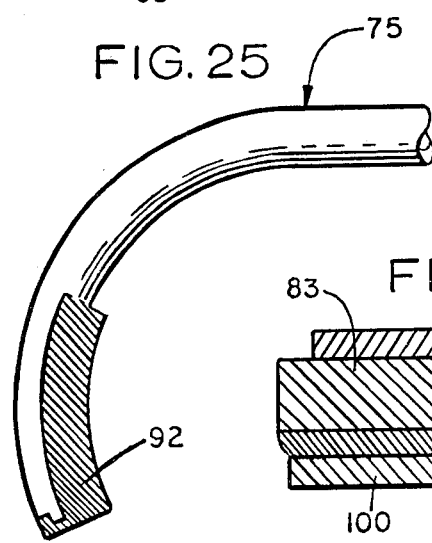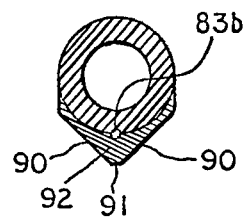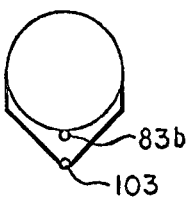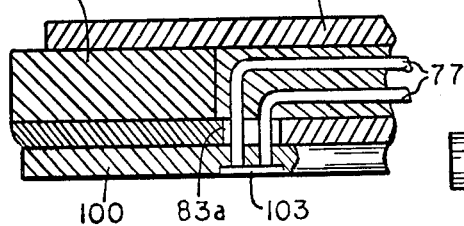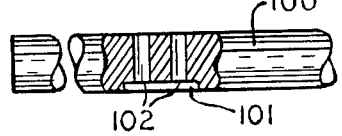

4,043,200

SURFACE THERMOCOUPLE

This is a division, of application Ser. No. 447,961 filed Mar. 4, 1974 and now U.S. Pat. No. 3,874,239, and Ser. No. 529,405 filed Dec. 4, 1974 now U.S. Pat. No. 3,939,554.

This invention relates in general to a thermocouple assembly, and more particularly to a thermocouple assembly for measuring surface temperatures, and still more particularly to a surface thermocouple assembly for measuring the temperatures of heat exchanger tubes for heaters or furnaces, and still more particularly to a method of making an improved surface thermocouple, and still more particularly to an improved surface thermocouple assembly in combination with a tube of a heat exchanger and the method of mounting the assembly on the tube.

The thermocouple assembly of the present invention is primarily intended for obtaining accurate temperature measurement of fired heat exchanger tubes in order to provide optimum safe and efficient operation. For example, it is important to accurately measure the tube skin or surface temperature of heat exchanger tubes in heaters for refineries where petroleum is being heated for refining operations in order to maintain optimum product flow through the heat exchanger at all times, and prevent tube rupture or damage. Specifically, obtaining accurate tube wall temperature measurements permits the operator to adjust the operating conditions of the heater so that maximum allowable temperatures are not exceeded while at the same time obtaining maximum product flow through the heat exchanger even with the existence of tube fouling.

Many factors make it difficult to obtain accurate temperatures of refinery heater tubes with the use of thermocouples since the thermocouples must be mounted on the tubes where high temperature gases and flame are encountered. These gases and flame may be up to 600° to 800° F. hotter than the heater tube at the point of measurement. It should be appreciated the gases and flame are deleterious to the materials of the thermocouple's assemblies and heat transferred along the assemblies to the point of attachment by the gases and flame tend to cause the thermocouple to be responsive to the temperature of these gases and flame rather than the tube wall. These situations prevent the efficient product flow rate through the tubes.

Heretofore, thermocouple assemblies used for monitoring tube wall temperatures of heat exchangers have not been sufficiently accurate and reliable due to the design and the manner in which the assemblies have been mounted on the tube walls. Also, insufficient protection has been given to known thermocouple assemblies to withstand the gases and flames in a heater.

Surface thermocouples such as those illustrated in U.S. Pat. Nos. 1,140,701 and 2,607,808 have not been satisfactory since they do not properly isolate the thermocouple conductors from the combustion gases of the heaters. Accordingly, early failure and inaccurate temperature monitoring is experienced.

It has been proposed that shielding of thermocouple assemblies protects thermocouple conductors and the thermojunction from the effects of gases and flame, as in U.S. Pat. Nos. 2,048,680 and 2,048,681; but such arrangements have not been satisfactory because of difficulties in obtaining leakproof welds at the point of attachment of the shield to the tube. Further, the shield being in the form of a tubular member is necessarily massive and of a large physical size to accommodate the ceramic insulators and thermocouple conductors such that it is difficult to provide expansion loops, and further a "shadow" is cast on the tube by the large shield, preventing the absorption of part of the radiant and conductive energy. Moreover, the interior of the tubular shield having a temperature gradient therealong causes convection of gases which draws in contaminates such as refinery gases and moisture that tends to deteriorate the conductors and thermojunction.

One specific pad-type thermocouple assembly heretofore known and illustrated in U.S. Pat. No. 3,143,439 is unsatisfactory since the pad is secured to the tube wall by depositing a weld bead at the periphery of the pad which causes arching and separation of the pad from the tube wall surface. This creates a void or gas gap that is thermally resistive, thereby causing the hot junction of the assembly tube more responsive to the gases and flame temperature and less responsive to the tube wall temperature, which results in a temperature readout higher than that of the tube wall. Ultimately, this would in turn prevent operating the heater with the optimum product flow through the heat exchanger, thereby decreasing the overall efficiency of the heat exchanger.

The present invention avoids the problems heretofore known in providing a surface thermocouple assembly which obtains the maximum thermal conductivity between the hot junction or sensing end of the assembly and the tube wall of a heat exchanger and at the same time minimizing thermoconductivity between the hot junction and the gases and flame. Accordingly, the thermocouple will respond to the actual tube wall temperature and not the gases temperature to provide an accurate and reliable temperature readout so that the heater can be operated to provide maximum product flow and efficiency while at the same time preventing tube damage or failure. The present invention creates a long heat path between the gases and thermocouple hot junction and a shorter direct heat path between the hot junction and the tube wall.

The thermocouple assembly of the invention includes sheathed thermocouple conductors between the cold junction or reference end and the hot junction or sensing end and a pad formed on the hot junction end integrally with the sheath and so the pad can be thereafter attached by welding to a heater tube wall with void-free welding such that the distance between the thermojunction and the tube wall is substantially less than the distance between the thermojunction and the nearest surface subjected to the high temperature gases and flame. The assembly is made by performing operations on a length of insulated and sheathed thermocouple conductors in a manner hereinafter described. The shape of the pad is unique and such as to permit the proper mounting to a tube wall to accomplish the objectives of obtaining long life, accurate and reliable operation.

It is therefore an object of the present invention to provide a new and improved surface thermocouple assembly for monitoring the temperature of heat exchanger tubes and particularly tubes heated by combustion gases.

Another object of this invention is in the provision of an improved surface thermocouple assembly for heat exchanger tubes which provides long life, accurate and reliable operation, together with ease of installation so that such operation can be obtained.

A still further object of the invention resides in the provision of an improved thermocouple assembly which may be installed on heat exchanger tubes with relative ease by conventional welding operations.

Still another object of the invention is to provide an improved thermocouple assembly and a method of making the assembly wherein the thermocouple materials of the assembly are protected against exposure to deleterious combustion gases and where the assembly is responsive to tube wall temperature and not influenced by surrounding gas temperatures.

A still further object of the invention is to provide a thermocouple assembly for monitoring heat exchanger tubes wherein the thermocouple conductors are protected by a sheath and compacted insulating material to resist combustion gas corrosion and which will retain integrity when suspended from its point of attachment to a tube to its point of exit through the heater wall under firing conditions.

Another object of the invention is to provide a thermocouple assembly including a lead section which can be formed or bent during installation without effecting its operation thereafter and which may be formed for permitting relative movement between the point of attachment to a heat exchanger tube and the exit point from the heat exchanger enclosure.

A still further object of the invention is in the provision of an improved surface thermocouple assembly and the mounting of the assembly on a heater tube where the heat path between the tube wall surface and the thermojunction or hot junction is short and direct and the heat path between the thermojunction and the surrounding gases is lengthy and indirect and particularly where the heat path between the thermojunction and the outer wall is substantially less than that between the thermojunction and the combustion gases.

Other objects, features and advantages of the invention will be apparent from the following detailed disclosure, taken in conjunction with the accompanying sheets of drawings, wherein like reference numerals refer to like parts, in which:

FIG. 1 is a fragmentary sectional view taken through a heater or furnace and a heat exchanger tube having the thermocouple assembly of the present invention mounted on the tube and diagrammatically connected to a temperature readout instrument;

FIG. 2 is a fragmentary side elevational view of the heat exchanger tube and thermocouple assembly taken generally along line 2—2 of FIG. 1;

FIG. 3 is a top plan view of the thermocouple assembly of the invention mounted on the heat exchanger tube and taken generally along line 3—3 of FIG. 1;

FIG. 4 is an enlarged perspective view of the thermocouple assembly mounted on a heat exchanger tube according to the embodiment of FIG. 1;

FIG. 5 is an enlarged side elevational view of the form of thermocouple assembly of FIG. 1 illustrating diagrammatically the relative position of the thermojunction or hot junction in the hot junction or sensing end of the assembly;

FIG. 6 is a longitudinal sectional view of the sensing end of the assembly taken substantially from the encircled area of FIG. 5;

FIG. 7 is an enlarged end elevational view of the hot junction end of the assembly and a fragmentary section of the heat exchanger tube illustrating the voidfree weldments securing the hot junction end of the assembly to the tube wall;

FIG. 8 is a diagrammatic illustration of the welding details for welding the hot junction end to the heat exchanger tube wall;

FIG. 9 is an enlarged end elevational view of a completely formed hot junction end of the thermocouple assembly of the present invention illustrating the structure of the welding surfaces;

FIG. 10 is an enlarged diagrammatic view of a heat exchanger tube illustrating the various positions for the hot junction end of a wraparound assembly according to the invention;

FIG. 11 illustrates diagrammatically another form of mounting a thermocouple assembly on a heat exchanger tube with an expansion loop and a near side junction location;

FIG. 12 is a view similar to FIG. 1 but illustrating a typical straight junction mounting of an assembly;

FIG. 13 is a fragmentary enlarged perspective view of the axial installation shown in FIG. 12;

FIG. 14 is a fragmentary sectional view taken of the straight junction type of assembly shown in FIGS. 12 and 13;

FIGS. 15 to 31 illustrate a method of making the thermocouple assembly according to the invention and a modification thereof as follows:

FIG. 15 is a partly sectional broken side elevational view of a length of sheathed and insulated thermocouple conductors, illustrating a portion of the sheath and insulation stripped from one end thereof;

FIG. 16 is an enlarged sectional view taken axially through one end illustrating the formation of a keyhole slot and the removal of insulation around the conductors;

FIG. 17 is a bottom plan view of the sheath with the keyhole slot;

FIG. 18 is an end elevational view of the sheath with the keyhole slot;

FIG. 19 is an axial sectional view illustrating the conductors bent to extend through the hole in the keyhole slot with the ceramic plug installed, additional insulation material compacted around the bends of the conductors, a fusion weld on the conductors to form the thermojunction, an end plug press fit into the end of the sheath and welded into position with the keyhole slot filled with weld;

FIG. 20 is an end elevational view of the formation shown in FIG. 19;

FIG. 21 is a detailed elevational view of the hot junction end illustrating the bending of the hot junction end for defining a wraparound assembly although this step would be omitted if the assembly is to be of the straight junction type;

FIG. 22 is an elevational view of the filler rod employed to build up the pad;

FIG. 23 is a side elevational view of the hot junction end showing the filler rod in position on the sheath and initially welded thereto;

FIG. 24 is a diagrammatic illustration of the welds for initially attaching the filler rod to the sheath;

FIG. 25 is a view like FIG. 23 showing the further weld buildup between the filler rod and the sheath;

FIG. 26 is a view like FIG. 24 illustrating diagrammatically the buildup welds along the sheath and filler rod;

FIG. 27 is an end elevational view of the hot junction end illustrating the V-shape of the pad and the knife edge defined;

FIG. 28 is a partly sectional fragmentary view of the reference or cold junction end of the assembly to illustrate the sealing of the sheath relative the thermocouple conductors;

FIG. 29 is an elevational view like FIG. 22 showing a modified filler rod with conductor holes and a milled slot for bringing the thermojunction closer to and substantially right at the knife edge of the pad;

FIG. 30 is a longitudinal sectional view like FIG. 19 showing the filler rod modification of FIG. 29; and FIG. 31 is a diagrammatic showing of the comparative locations of the thermojunction relative to the knife edge of the pad for the embodiments of FIGS. 27 and 30.

Referring now to the drawings and particularly to FIGS. 1 to 3, a typical installation of a thermocouple assembly according to the invention is shown for a furnace or heater. It should be appreciated that the assembly of the invention is primarily intended for monitoring temperatures of heat exchanger tubes so that the heat exchanger can be operated at optimum efficiency and so that damage or injury to the heat exchanger tubes because of overheating can be avoided. Therefore, the thermocouple assembly as associated with a heater tube provides maximum safety and efficiency, and especially since accurate and reliable temperature monitoring operations are performed by the assembly of the invention. It should be further appreciated that the heat exchanger tubes are exposed to high temperature combustion gases and flame while carrying a suitable product to be heated.

While the assembly of the invention is shown generally in connection with the temperature monitoring of a single heat exchanger tube, it should be appreciated that any number of thermocouple assemblies may be utilized in a single heater or furnace for monitoring temperatures of tubes at desired locations.

In FIGS. 1 to 3, the furnace or heater includes a wall 35 defining a combustion chamber 36 in which a heat exchanger 37 is located as represented by a single tube 38. The thermocouple assembly according to the invention in the form illustrated in FIGS. 1 to 3 is generally indicated by the numeral 40 and includes sheathed thermocouple conductors 41 with a hot junction or sensing end 42 and a cold junction or reference end 43. As illustrated, the hot junction end is mounted on the outer surface of the tube 38, while the sheath of the thermocouple extends through the furnace wall 35, and the cold junction end 43 is connected to a terminal block and head assembly 44 that is in turn connected to a temperature readout instrument 45. The exit point of the thermocouple assembly at the furnace wall may have a sliding fit to handle longitudinal movement caused by expansion and contraction of the heat exchanger or may be sealed and fixed where an expansion loop 46 is provided in the thermocouple assembly to handle relative movement of the heat exchanger tube. Hence, it will be understood that if the expansion loop is not provided, movement of the heat exchanger tube may be handled at the furnace wall. While the hot junction end 42 of the thermocouple assembly is welded in place on the heater tube, it may be additionally fastened to the heater tube by means of a retaining clip 47.

The installation illustrated in FIGS. 1 to 3 is in the form of a wraparound thermocouple assembly where a portion of the thermocouple wraps around the heater tube. In this illustration the assembly is wrapped around ninety degrees. However, it should be appreciated that the assembly may be wrapped around to a greater or lesser extent as shown by the positions in FIG. 10. It should be further appreciated that the hot junction end of the thermocouple assembly may be positioned at the far side of the tube, as shown in FIGS. 1 to 3, or at the near side, as illustrated in FIG. 11. In general, the hot junction end will be positioned at a hot spot of the tube.

It should be further appreciated that the thermocouple assembly of the invention, instead of being formed for wraparound mounting as in FIGS. 1 to 4, may be used in a typical straight junction installation as illustrated in FIGS. 12 and 13. Here the assembly is identified by the numeral 40A where the hot junction end 42A is arranged axially with respect to the heater tube 38A. The cold junction end 43A is also connected to a suitable terminal block and head assembly outside the furnace wall 35.

Referring now particularly to FIGS. 5, 6, 7, 8 and 9, the hot junction end 42 of the thermocouple assembly includes a thermojunction or hot junction 50 defined by the joining of the ends of the thermocouple conductors 51. Any suitable combination of metals may be provided for the conductors, such as iron-constantan, chromel-alumel, or the like. The conductors are arranged within a tubular metal sheath 52 and electrically insulated from each other and from the sheath by means of a suitable ceramic insulation 53. The ceramic insulation may be of any suitable type, such as magnesium oxide, aluminum oxide or berylium oxide, which is initially provided in granular or powdered form but compacted in the sheath so that the conductors are fully supported in insulated relation to each other and to the sheath. Moreover, the compacted insulation eliminates any space for passage of gases within the sheath which could be deleterious to the conductors and the junction.

The hot junction end of the assembly is closed to define an end wall 54 and the conductors are bent substantially perpendicular relative to the axis of the sheath through an opening in the sheath wall and maintained in spaced relation by a hard ceramic junction insulating plug 55. The manner in which the hot junction end is formed will be described hereinafter. The hot junction 50 is formed by fuse-welding the ends of the thermocouple conductors together outside the ceramic plug 55. A pad 56 is provided at the hot junction end which also is suitably formed, as will be described hereinafter, to provide suitable weld surfaces for facilitating the welding of the hot junction end to the heater tube. As particularly seen in FIG. 9, the pad 56 is generally V-shaped in cross section and includes inclined weld surfaces 57, 57 merging to a substantially knife edge 58 which is first placed into engagement with the tube at the commencement of the welding operations. The knife-shaped edge 58, as illustrated in FIGS. 7 and 8, abuts directly against the skin or surface of the tube 38 to which the hot junction end is to be connected. this brings the hot junction 50 in close proximity to the tube wall. Following the positioning of the hot junction end on a tube surface, conventional welding steps result in securing the thermocouple to the tube. As seen in FIG. 9, the weld surfaces 57 are angularly spaced apart about nintey degrees so that when the assembly is positioned in relation to a surface onto which it is to be welded in an erect manner, the weld surfaces are angularly related to the tube surface about 45 degrees. This is considered a substantially ideal arrangement for facilitating welding to two parts together.

As illustrated in FIG. 8, the welding operations include initial or root weld passes 60, 60 between the weld surfaces 57 and the tube surface 38. Thereafter, secondary weld passes 61, 61 are produced between the weld surface 57 of the thermocouple assembly and the tube surface 38. Thereafter, final weld passes 62, 62 and 63, 63 complete the weldment. Care must be taken during the welding operations to preclude any voids or gas gaps in the weldment.

It will be appreciated that a solid metal heat path is produced between the hot junction 50 and the skin of the tube 38 by the thermocouple assembly and the manner in which it is attached to the tube wall. Further, the distance between the thermojunction and the skin of the heater tube, as indicated in FIG. 8 at 65, is substantially less than the distance between the thermojunction and the nearest receptor surface or surface where combustion gases impinge as represented by 66 and 67. It will be appreciated here the distances axially of the assembly to the nearest receptor surface, as indicated by the distances 68 and 69 in FIG. 5, are much greater than the distances 66 and 67 shown in FIG. 8. Accordingly, the comparative distances of concern may be best appreciated from FIG. 8. While the distance between the junction and the tube wall is substantially less than the shortest distance between the junction and a receptor surface, it can be appreciated that it is substantially less than half and less than about one-quarter.

The short direct path between the thermojunction and the tube wall provides a direct flow of heat energy therebetween, while the hotter combustion gases essentially bypass the junction by going along the sheath weld deposits to the tube wall. This minimizes the effect of the hot gases on the junction and results in making the hot junction responsive to the temperature of the tube wall and not the gases. Accordingly, a more reliable and accurate temperature monitoring operation of the tube can be obtained by the present invention.

It can be further appreciated that in order to permit the welding of the assembly to a tube wall without producing any voids between the sheath and tube, there must be provided suitable weld surfaces on the thermocouple assembly pad to enable such welding operations. It can be appreciated that any void provided in the weld would interrupt the heat transfer path. The length of the pad on the assembly is such that the thermojunction will be spaced sufficiently from the nearest receptor surface at the opposite ends of the pad.

While the details of a thermocouple assembly which is formed at the hot junction end is illustrated in FIG. 6, such an assembly that is straight is illustrated in FIG. 14. However, it will be appreciated that the function of the formed and the straight assemblies do not differ. It should be further recognized the material used for the tubular sheath will have high temperature strength. For example, it may be stainless steel and, more specifically, Inconel. Likewise, the weld material of the pad would be of a like material. Therefore, a short direct heat transfer path is defined between the hot junction and the tube surface, while a long indirect heat transfer path is defined between the hot junction and the combustion gases. And because the hot junction is so near to the tube wall, there will be no differences in temperature between the tube wall and at the point of the hot junction.

The method of making the thermocouple assembly of the invention is pictorially illustrated in FIGS. 15 to 28. A length of sheath material or bulk, as shown in FIG. 15, is first prepared by stripping the sheath and insulation from one end. The length of sheath material, generally designated by the numeral 75, includes a tubular metal sheath 76 enclosing thermocouple conductors 77 arranged in spaced and insulated relation from each other and from the sheath by compacted ceramic insulation 78. Stripping of sheath and insulation from the conductor 77 at the one end defines leads 79 which will be at the cold junction or reference end of the assembly, as will be more apparent hereafter.

The other end of the sheath material is then prepared for defining the hot junction end by first forming a keyhole slot 80 with a slot portion 81 and a hole portion 82. The slot extends axially of the sheath. Following the removal of insulation from the sheath around the conductors along the keyhole slot, the conductors are bent through the slot until they are in the hole or seat portion 82, as somewhat should also be appreciated that preferably the slot is formed along the sheath at a point aligning with a plane extending through the spaced conductors so that the conductors, as appearing in FIG. 18, are in superposed relation. A ceramic insulator or a plug 83a is then fitted over the conductors and in the insulator seat 82 for maintaining the conductors in spaced relation through the sheath wall, and insulated from each other and from the wall. The ends of the conductors may be treated so that a small portion extends beyond the ceramic plug 83a for fusion welding to form the junction 83b.

The cavity within the sheath above the ceramic plug 83a is filled with powdered ceramic insulating material such as magnesium oxide and compacted. A solid end plug 83 is inserted in the end of the sheath in press-fit relation against the added insulation so that the inner end is in slightly spaced relation from the bens of the conductors. The outer end of the plug extends slightly from the end of the sheath as seen particularly in FIG. 19. The slot 81 is then closed with a weld and a fillet weld is made between the end of the sheath and the end plug, thereby welding the end plug in place. No voids are made in the weld in the slot. The fillet weld, designated by the numeral 84 in FIG. 20, is made around the end of the sheath except in the area 84a.

Thereafter, the end of the sheath with the junction is suitably fomred along an arc if desired, as shown in FIG. 21, such that the junction is at the inside of the bend. It will be appreciated that the form shown in FIG. 21 will provide a ninety degree wraparound installation, such as that illustrated in FIG. 4, but the form could be whatever desired in order to provide the angular wraparound. It should be also be appreciated that if a straight junction installation is desired, such as in FIG. 13, it is not necessary at this point to form the hot junction end of the assembly as in FIG. 21.

The pad is then constructed for the hot junction end of the assembly by first fitting and welding a filler rod 85, as seen in FIGS. 22, 23 and 24. The filler rod is arcuately formed or of the same shape as the hot junction end and extends from the tip end of the end plug 83 inwardly a distance such that the junction 83b is about centered between the opposite ends of the filler rod. Root or initial welds 86, 86 are made along the filler rod end sheath, as seen in FIG. 24. It should be appreciated that the filler rod fits directly against the sheath and along the area of the thermojunction 83b.

Overlapping buildup welds 87 and 88 are made along each side between the sheath and the filler rod. Again, care is taken to prevent any voids in the weld buildup area. Additionally, as seen in FIG. 25, a weld cap 89 is provided over the end of the end plug and in the area 84a, thereby completely sealing the end of the sheath to prevent gases from entering there and into the sheath. The fillet weld is essentially completed then for the end plug.

As seen in FIG. 27, the weld areas are then machined to define the welding surfaces 90 and the knife-shaped edge 91 to complete the pad construction so that the pad 92 is then ready for welding onto a heater tube. This facilitates the ease of welding the hot junction end to the heater tube. It will be appreciated that the surfaces of the welds will be suitable cleaned to enhance further welding thereof onto a tube. Any further forming of the sheath, such as bending or an expansion loop or the like, is performed at this time.

Completing the construction of the thermocouple assembly 75, reference is made to the cold junction end shown in FIG. 28 where a portion of the insulation material is removed from the end of the sheath around the conductors and replaced with a suitable epoxy potting material 94 to seal the cold junction end of the sheath and prevent entrance of gases therein. The assembly is now completed for installation in a suitable heater or furnace.

Another embodiment of the invention is disclosed in FIGS. 29 and 30 and the method of making same. This embodiment differs from that previously described in the construction and placement of the thermojunction. While this embodiment is shown in connection with a typical straight junction thermocouple assembly, it should be appreciated that it could be a formed unit is disclosed in FIG. 28. Rather than use a filler rod like 85, shown in FIG. 22, a filler rod 100 is employed which includes a milled slot 101 extending axially of the rod and in alignment with a pair of diametrically extending conductor holes 102.

As seen particularly in FIG. 30, during the making of an assembly according to this embodiment, following the steps of bending the thermocouple conductors 77 through the keyhole slot, the seating of the ceramic plug 83a, the insertion of the end plug 83 and the welding in the keyhole slot and fillet welding of the end plug to the sheath, the modified filler rod 100 is positioned against the sheath so that the thermocouple conductor 77 extends through the conductor holes 102. The size of the holes 102 is such that the conductors will easily extend therethrough. With the filler rod 100 in position root welds are made along each side of the filler rod between it and the sheath to fasten the filler rod in position. A fusion weld to form the thermojunction 103, FIG. 30, is made in the milled slot 101. During the fusion weld an oxide forms on that part of the conductors extending through the filler rod to essentially electrically insulate the conductors from the filler rod in the area of the conductor holes 102. The depth of the milled slot is about one-third the diameter of the filler rod and the width and length is such as to slightly clear the conductor holes.

It can be appreciated that the thermojunction or hot junction in this embodiment is spaced even closer to the tube wall once the pad is completely constructed, as illustrated in FIG. 31. Indeed, the junction is essentially directly on the skin of the tube so that it will provide a most accurate and reliable temperature monitoring operation. Moreover, positioning of the thermojunction directly against the tube skin moves the junction further from the combustion gases.

It will be understood that modifications and variations may be effected without departing from the scope of the novel concepts of the present invention, but it is understood that this application is to be limited only by the scope of the appended claims.

The invention is hereby claimed as follows:

1. The method of mounting a thermocouple assembly on the surface of a furnace tube, wherein the tube is subjected externally to high temperature gases and flame and carries a fluid to be heated and wherein the thermocouple assembly includes an elongated tubular metal sheath, a pair of spaced thermocouple conductors within the sheath, electrical insulating material spacing and supporting said conductors within the sheath in insulating relation from each other and from the sheath, said conductors extending from the cold junction end for connection to the readout instrument, said conductors at the hot junction end being bent at substantially right angles to the sheath axis and extending through an opening in the sheath wall, a ceramic insulating plug in the opening receiving and holding said conductors in spaced and insulated relation from each other and from the sheath, a fusion weld at the ends of the conductors outside the plug defining the thermocouple hot junction, and a pad integral with the sheath and the hot junction, said pad having a substantially knife-shaped edge for direct engagement with the surface for which the temperature is to be monitored, which method comprises the steps of placing the knife-shaped edge of the assembly against the surface of the tube, and applying a void-free weldment between the pad and the tube such that the heat path between the hot junction and the outer tube surface is substantially less than the heat path between the hot junction and the nearest surface subjected to gases and flames.

* * * * *

UNITED STATES PATENT AND TRADEMARK OFFICE
CERTIFICATE OF CORRECTION

PATENT NO. : 4,043,200
DATED : August 23, 1977
INVENTOR(S) : Philip F. Finney

It is certified that error appears in the above-identified patent and that said Letters Patent are hereby corrected as shown below:

```
Col. 6, line 57, change "this" to --This--
Col. 8, line 18, after "somewhat" insert --shown in
                 Fig. 19. It--
        line 45, change "fomred" to --formed--
Col. 9, line 13, change "suitable" to --suitably--
        line 32, change "is" to --as--
```

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*